United States Patent

[11] 3,540,738

[72] Inventors Kozo Yamamoto
Hirakata-shi;
Morihisa Naito, Moriguchi-shi, Japan
[21] Appl. No. 711,677
[22] Filed March 12, 1968
[45] Patented Nov. 17, 1970
[73] Assignee Matsushita Electric Industrial Co., Ltd.
Osaka, Japan
a corporation of Japan
[32] Priority March 15, 1967
[33] Japan
[31] No. 42/16785

[54] MAGNETIC TAPE RECORDER OF MAGAZINE TYPE
6 Claims, 6 Drawing Figs.

[52] U.S. Cl. ........ 274/4; 242/199; 179/100.2;
[51] Int. Cl. ........ G11b 5/00
[50] Field of Search ........ 274/414, 9.1; 179/100.2, Z; 242/55.13, 55.12, 55.19A

[56] References Cited

UNITED STATES PATENTS

| | | | |
|---|---|---|---|
| 2,969,929 | 1/1961 | Rudzitis | 242/55.13 |
| 3,385,534 | 5/1968 | Staar | 242/55.13 |
| 3,394,898 | 7/1968 | Laa | 242/55.13 |
| 3,395,871 | 8/1968 | Ackermann et al. | 242/55.13 |
| 3,400,936 | 9/1968 | Staar | 274/11 |
| 3,429,519 | 2/1969 | Staar | 274/4 |

*Primary Examiner*—Leonard Forman
*Assistant Examiner*—Dennis A. Dearing
*Attorney*—Stevens, Davis, Miller & Mosher

ABSTRACT: A tape recorder of the magazine type having a movable platform containing tape recording and reproducing apparatus thereon. The movable platform is biased to an inoperative position to automatically eject a tape cartridge in response to a cartridge unlocking operation. The insertion of a tape magazine causes the movable platform to pivot within a guide slot causing the movable platform to move to an operative position in order to record on or reproduce from the tape magazine.

MAGNETIC TAPE RECORDER OF MAGAZINE TYPE

BACKGROUND OF THE INVENTION

This invention relates to tape recorders of the magazine type adapted to operate with a tape magazine of the kind in which a magnetic tape supplied from one reel is taken up on the other and with which the reel shafts and the capstan are brought into driving engagement as it is progressively inserted into a magazine insertion opening, and more particularly to a tape recorder of the type described above which is provided with means by which the tape magazine can automatically be ejected sufficiently out of the magazine insertion opening in response to an unlocking operation for the withdrawal of the tape magazine from the tape recorder.

Conventional tape recorders of the magazine type have been defective in that the tape magazine cannot smoothly be inserted into and withdrawn from the tape recorder body and the magnetic head and other elements are subject to excessive force during the insertion or withdrawal of the tape magazine.

SUMMARY OF THE INVENTION

The present invention contemplates the provision of a tape recorder of the magazine type which overcomes the difficulty encountered with conventional tape recorders of this kind in spite of the fact that it has a very simple construction.

It is a primary object of the present invention to provide a tape recorder of the magazine type adapted to operate with a tape magazine of the kind equipped with two rotatable hubs for the supply and takeup of a magnetic tape enclosed therein, having a movable body provided with means for driving said tape in said magazine and movable between two extreme positions in response to insertion and withdrawal of said magazine into and out of a magazine insertion opening in said tape recorder, and a stationary casing movably supporting said movable body therein, said movable body carrying thereon a drive motor, a capstan mounted in coaxial relation with a flywheel which is driven from said drive motor so as to drive said tape in said magazine, and reel shafts for causing rotation of said two hubs in said magazine, said casing carrying thereon a magnetic head engageable with said tape in said magazine, and a pinch roller for holding said tape between it and said capstan on said movable body so as to drive said tape in cooperation with said capstan; said tape recorder comprising means for pivotally and linearly movably supporting one end, which is remote from the side carrying said reel shafts, of said movable body in one end of said casing so that said movable body can make a linear movement at said one end in the moving direction of said magazine while making a pivotal movement about said one end, means disposed on said casing and slidable relative to said casing by being engaged by said magazine as the latter is progressively inserted into said magazine insertion opening, first resilient means disposed between said movable body and said casing, and second resilient means disposed between said slidable means and said casing so as to normally urge said slidable means toward said magazine insertion opening, said first resilient means being operative to cause a return movement of said magazine to a certain position, said second resilient means being operative to cause a further return movement of said magazine beyond the said position by an amount corresponding to the play preset between said slidable means and said movable body, whereby said magazine can easily be withdrawn out of said magazine insertion opening.

DESCRIPTION OF THE PREFERRED EMBODIMENT

Figure 1:
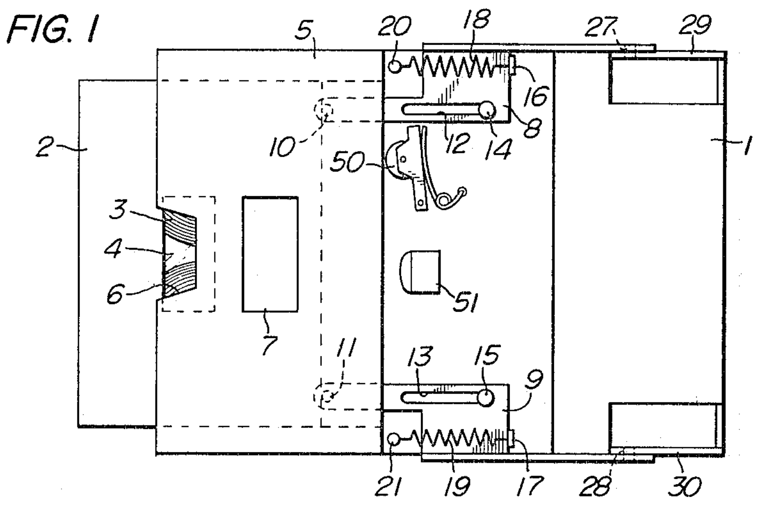
FIG. 1 is a top plan view of the tape recorder of the magazine type embodying the present invention.

A preferred embodiment of the tape recorder of the magazine type according to the present invention will be described with reference to FIGS. 1 to 6. The tape recorder comprises a generally boxlike stationary casing 1 which is provided on its upper face with a frame member 5 defining therein an insertion opening for a tape magazine 2. The tape magazine 2 is provided with aligned tape reading windows 4 at a substantially central position of its upper and lower faces so that a magnetic tape 3 enclosed in the tape magazine 2 can be seen through the windows 4. The upper panel of the frame member 5 is suitably cut out as at 6 at a middle portion of the front end overlying the entrance to the magazine insertion opening. The upper panel of the frame member 5 is further provided with a substantially central sight hole window 7 so that the tape 3 enclosed in the tape magazine 2 can be seen through the tape reading windows 4 and through the sight hole window 7 when the tape magazine 2 is completely inserted into the magazine insertion opening. In the completely inserted position of the tape magazine 2, its rear end is situated inwardly beyond the front or entrance side end of the frame member 5, and in such a position, reel shafts and other drive means described later can engage the corresponding elements in the tape magazine 2. A pair of levers 8 and 9 are slidably mounted on the casing 1 and have respective upstanding pins 10 and 11 at the front ends thereof so that the pins 10 and 11 can be engaged by the leading end of the tape magazine 2 as the latter is inserted into the frame member 5, thereby urging the levers 8 and 9 inwardly or rearwardly. Elongated slots 12 and 13 extend through the central portion of the respective levers 8 and 9 in the movable direction of the latter in aligned relation with the respective pins 10 and 11 and loosely receive therein respective guide pins 14 and 15 which are secured to the upper face of the casing 1. Coil springs 18 and 19 are anchored at one end to lugs 16 and 17 formed integrally with the levers 8 and 9 and at the other end to upstanding pins 20 and 21 secured to the casing 1, respectively, so as to normally urge the levers 8 and 9 forwardly toward the frame member 5. The resilient return force of the springs 18 and 19 urges the levers 8 and 9 to return further forwardly beyond their normal inoperative position even after a downward movement of a movable body 24 described later has been completed. Cutouts 22 extend inwardly from the other ends of the respective levers 8 and 9 for the purpose described later.

Figure 5:
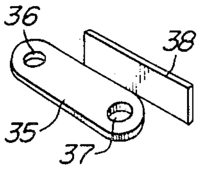
FIG. 5 is an enlarged perspective view of a locking member employed in the tape recorder of FIG. 1.
Figure 6:
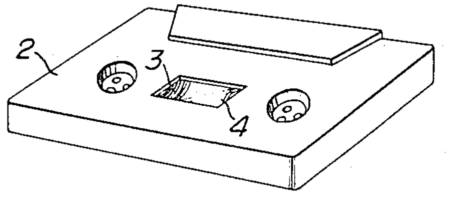
FIG. 6 is a perspective view of a tape magazine employed in the tape recorder of the present invention.

Portions of the upper wall of the casing 1 are cut open and bent to stand upright to provide upstanding portions 29 and 30, and parallelly registered slots 31 are provided in the upstanding portions 29 and 30. A movable body 24 carrying thereon tape drive means including a drive motor, a flywheel, reel shafts 25, and a capstan 26 coaxial with the flywheel is provided at one end thereof with laterally extending pins 27 and 28 which extend into the slots 31 in the upstanding portions 29 and 30 of the casing 1 and into the cutouts 22 in the levers 8 and 9 so as to pivotally as well as linearly movably support that end of the movable body 24 in the corresponding end of the casing 1. The movable body 24 is normally urged to its lower position by a spring 33. Locking members 34 of a flat oval shape are each provided with holes 36 and 37 adjacent to opposite ends, and an engaging strip 38 extends integrally from one side of one of the locking members 34 in a direction normal thereto to terminate at a position beyond one end of the locking member 34 as shown in FIG. 5. A pin 39 extending through the hole 37 disposed adjacent to the end carrying the engaging strip 38 pivotally connects each locking member 34 to a central portion of the side wall of the casing 1, while a pin 40 secured to the sidewall of the movable body 24 extends through the other hole 36 in the locking member 34 to be slidably received in an arcuate guide slot 41 formed in the corresponding sidewall portion of the casing 1.

Figure 3:
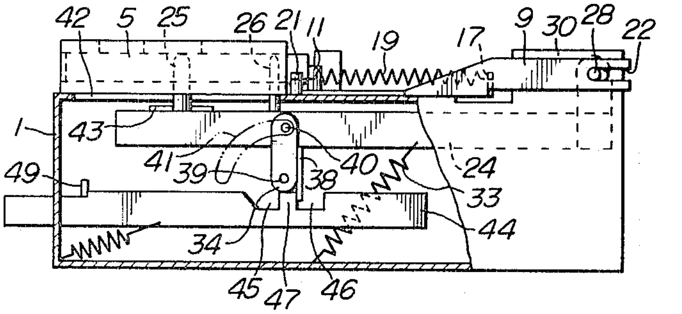
FIG. 3 is a partly sectional, side elevational view of the tape recorder shown in FIG. 1, the tape recorder being shown in the state after the complete insertion of the tape magazine.

As will be understood from the structure described above, the other or front end of the movable body 24 is normally urged downwardly by the force of the spring 33, and the opposite or rear end of the movable body 24 is movable in the moving direction of the levers 8 and 9 when the latter are forced rearwardly against the force of the springs 18 and 19. As a result, the pins 40 secured to the sidewalls of the movable body 24 are caused to slide within the arcuate guide slots 41 thereby to urge the front end of the movable body 24 to move upwardly against the force of the spring 33, thus bringing the movable body 24 to its horizontal position as seen in FIG. 3.

An aperture 42 is formed in the upper wall of the casing 1 so that the reel shafts 25 and the capstan 26 carried by the movable body 24 can project into the magazine insertion opening in the frame member 5 when the movable body 24 is so moved upwardly. A reflecting plate 43 in the form of a sheet of stainless steel or the like is disposed on a central upper face portion adjacent to the front end of the movable body 24 so that the relative amount of the tape 3 carried by the reels within the tape magazine 2 when it is inserted in the magazine insertion opening in the frame member 5 can be distinctly seen through the sight hole window 7 of the frame member 5 and through the tape reading windows 4 of the tape magazine 2 by the light reflected back from the reflecting plate 43.

A record lever 44 disposed within the casing 1 is movable in a direction same as the moving direction of the levers 8 and 9 and has one end thereof projected outwardly from the casing 1. Cutouts 45 and 46 are provided in a suitably spaced relation on the upper end of the record lever 44 and define therebetween a land or lug 47. The record lever 44 is normally urged outwardly by a coil spring 48, but is limited in its outward movement by being engaged by an engaging lug 49 fixed to one of the side walls of the casing 1.

When the rear end of the movable body 24 is urged rearwardly by the advancing movement of the levers 8 and 9 and consequently the front end of the movable body 24 is urged upwardly to bring the movable body 24 to its horizontal position, the movable body 24 can be held in such a position by being locked by a locking mechanism (not shown) and can then be unlocked to return to its original lower position. In the course of the upward movement of the movable body 24 to take its horizontal position by being urged by the levers 8 and 9, the locking members 34 are rotated about the pins 39 with the result that the projected end of the engaging strip 38 moves into the inner or rear cutout 46 of the record lever 44. In FIG. 1 it will be seen that a pinch roller 50 and a magnetic head 51 are mounted on a central upper face portion of the casing 1.

Figure 4:
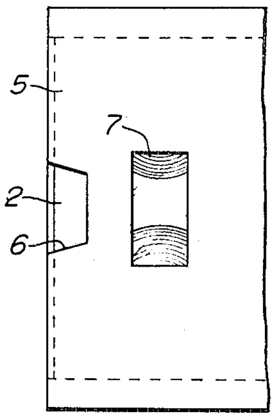
FIG. 4 is a top plan view of part of the tape recorder in the state shown in FIG. 3.
Figure 2:
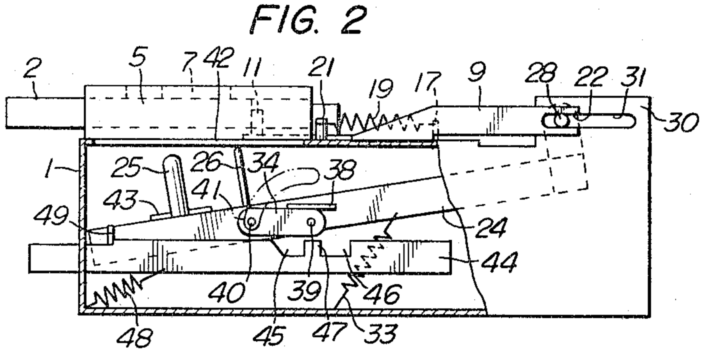
FIG. 2 is a partly sectional, side elevational view of the tape recorder shown in FIG. 1, the tape recorder being shown in the state before the insertion of a tape magazine.

The operation of the tape recorder having a structure as stated above will now be described in detail. In the inoperative position of the movable body 24 shown in FIG. 2, the front end thereof is forced downwardly by the force of the spring 33, and the levers 8 and 9 are held in their inoperative position by the force of the respective springs 18 and 19. In such a state, the locking members 34 are in their horizontal position. Under the above state of the tape recorder, the tape magazine 2 is inserted into the magazine insertion opening in the frame member 5 in a direction as shown by the arrow. The leading end of the tape magazine 2 engages the pins 10 and 11 and thereby urges the levers 8 and 9 rearwardly against the force of the springs 18 and 19, which causes upward movement of the front end of the movable body 24. Consequently, the reel shafts 25 and the capstan 26 project through the aperture 42 into the magazine insertion opening, and in the completely inserted position of the tape magazine 2 within the insertion opening as seen in FIG. 3, the reel shafts 25 and the capstan 26 are brought into driving engagement with the corresponding elements in the tape magazine 2, the movable body 24 being then locked in such a state by the locking mechanism. In this locked state, the rear or trailing end of the tape magazine 2 is situated inwardly beyond the entrance side end of the frame member 5 and a portion of the rear end of the tape magazine 2 is only exposed at the cutout 6 formed in that end of the frame member 5 as seen in FIG. 4.

The above movement of the front end of the movable body 24 is guided by the upward sliding movement of the pins 40 along the guide slots 41, and the movement of the pins 40 causes swinging movement of the locking members 34 about the pins 39, with the result that the projected end of the engaging strip 38 fixed to one of the locking members 34 moves into the cutout 46 of the record lever 44. Because of the above situation, an attempt to force the record lever 44 inwardly by gripping the acutating end thereof thereby to place the internal electrical circuit system in a recordable state results in an utter failure due to the fact that the lug 47 of the record lever 44 is engaged by the engaging strip 38 which is an integral part of the locking member 34. Thus, fast forwarding or rewinding of the tape 3 in the tape magazine 2 can freely be made in the above state of the tape recorder.

The recordable condition can be established by inserting the tape magazine 2 in a state of the tape recorder in which the record lever 44 is forced inwardly against the force of the spring 48. In this case, the projected end of the engaging strip 38 integral with the locking member 34 moves now into the cutout 45 of the record lever 44 and thereby the record lever 44 is locked in such a position by being engaged by the engaging strip 38 so as to place the tape recorder in the recordable condition.

The tape magazine 2 can be withdrawn from the tape recorder by merely releasing the lock imparted to the movable body 24 by the locking mechanism (not shown). The front end of the movable body 24 is restored to its normal inoperative position by the force of the spring 33, and the restoration of the movable body 24 is followed by restoration of the levers 8 and 9 to their normal inoperative position. Since the levers 8 and 9 are arranged for making a further forward movement by the force of the springs 18 and 19 even after the movable body 24 has moved to its lower position, a large force imparted to the tape magazine 2 by the pins 10 and 11 ejects the tape magazine 2 sufficiently out of the frame member 5. In this connection, it will be recalled that, in the completely inserted position of the tape magazine 2, its rear end is situated inwardly beyond the entrance side end of the frame member 5 and a portion of the rear end of the tape magazine 2 is only exposed at the cutout 6 in that end of the frame member 5. Therefore, the proper procedure for the insertion of the tape magazine 2 into the insertion opening should be such that a finger is applied to the tape magazine 2 at the central portion corresponding to the position of the cutout 6 and the tape magazine 2 is advanced until the finger enters the cutout 6. Thus, the provision of the cutout 6 ensures insertion of the tape magazine into the frame member 5 with a uniform force and without imparting any deflecting movement thereto, so that the tape magazine 2 can very smoothly be inserted in position in the tape recorder.

I claim:

1. A tape recorder of the magazine type comprising: a frame member having an opening therein to receive a magazine; a movable body, said movable body including means to drive the tape within the magazine, said movable body further including tape transducing means means for pivotally and linearly movably supporting said movable body, comprising guiding means connected to said movable body, means defining arcuate slots in said frame member, and means defining slots in said frame member extending in the same direction as that in which said magazine is inserted, all said slots being adapted to receive said guiding means; means biasing said movable body to an inoperative position whereby insertion of a magazine into said opening causes said guiding means to move within said slots, causing said movable body to be disposed in operative relationship with the magazine; a record lever extending into said frame member; a lug located on said record lever; means defining a cutout on either side of said lug on said record lever; a pivotal locking member pivoted at one end thereof to one of said guiding means moving in one of said arcuate slots, and at the other end to said frame member; and an engaging strip mounted on said locking member, said engaging strip being adapted to move into one of said cutouts when said movable body is disposed in operative relationship with said magazine.

2. The tape recorder of claim 1 further comprising: a movable lever having mounted thereon means adapted to contact said magazine; conducting means secured on the frame member for conducting said lever in the same direction as that in which said magazine is displaced upon insertion, said lever being adapted upon being moved a predetermined distance by said magazine to engage said means for movably supporting said movable body, thereby causing actuation thereof; resilient means for biasing said lever to an inoperative position so that upon release of said magazine from said frame member said biasing means operate to cause a return movement of said magazine by said predetermined distance.

3. The tape recorder of claim 2 further including a magazine insertion opening in said frame member and a substantially central cutout space provided at the entrance side of said frame member, whereby in the completely inserted state of said magazine, a portion of the rear end thereof is exposed at said cutout space.

4. The tape recorder of claim 1 in which said means biasing said movable body to an inoperative position comprise springs.

5. The tape recorder of claim 2 in which said resilient means for biasing said lever to an inoperative position comprise springs.

6. The tape recorder of claim 2 in which both the means biasing said movable body to an inoperative position and the means for said lever to an inoperative position comprise springs.

UNITED STATES PATENT OFFICE

CERTIFICATE OF CORRECTION

Patent No. 3,540,738 Dated November 17, 1970

Inventor(s) Kozo YAMAMOTO and Morihisa NAITO

It is certified that error appears in the above-identified patent and that said Letters Patent are hereby corrected as shown below:

The following priority information should be added:

-- Foreign Application Priority Data

March 15, 1967 Japan 16785/67

March 15, 1967 Japan Utility Model 22331/67 --

Signed and Sealed this

Fifth Day of October 1976

[SEAL]

*Attest:*

RUTH C. MASON
*Attesting Officer*

C. MARSHALL DANN
*Commissioner of Patents and Trademarks*